United States Patent
Ozawa

(10) Patent No.: US 11,930,296 B2
(45) Date of Patent: Mar. 12, 2024

(54) TRANSMISSION DEVICE, RECEPTION DEVICE, AND TRANSMISSION SYSTEM WITH PADDING CODE INSERTION

(71) Applicant: Sony Semiconductor Solutions Corporation, Kanagawa (JP)

(72) Inventor: Miho Ozawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 16 days.

(21) Appl. No.: 17/776,750

(22) PCT Filed: Nov. 12, 2020

(86) PCT No.: PCT/JP2020/042254
§ 371 (c)(1),
(2) Date: May 13, 2022

(87) PCT Pub. No.: WO2021/100602
PCT Pub. Date: May 27, 2021

(65) Prior Publication Data
US 2022/0408055 A1    Dec. 22, 2022

(30) Foreign Application Priority Data
Nov. 20, 2019   (JP) ................................. 2019-209580

(51) Int. Cl.
*H04L 69/22*   (2022.01)
*H04N 7/01*    (2006.01)

(52) U.S. Cl.
CPC ........... *H04N 7/0127* (2013.01); *H04L 69/22* (2013.01)

(58) Field of Classification Search
CPC ....................................................... H04L 69/22
USPC .................................................. 348/461, 465
See application file for complete search history.

(56) References Cited

FOREIGN PATENT DOCUMENTS

| EP | 2640055 A1 | 9/2013 | |
| EP | 3637715 A1 * | 4/2020 | ......... G01N 27/3335 |
| JP | 2010176519 A | 8/2010 | |
| JP | 2011082934 A | 4/2011 | |
| JP | 2012120158 A | 6/2012 | |
| WO | WO-2018225533 A1 * | 12/2018 | ......... G01N 27/3335 |

(Continued)

OTHER PUBLICATIONS

International Search Report (PCT/ISA/210), International Application No. PCT/JP2020/042254, dated Dec. 22, 2020.

(Continued)

*Primary Examiner* — Hee Soo Kim
(74) *Attorney, Agent, or Firm* — Michael Best & Friedrich LLP

(57) ABSTRACT

A transmission device according to the present disclosure includes: a transmission unit configured to output, to a transmission channel, a plurality of packets each including a payload and a header added to the payload, the payload including pixel data corresponding to one line included in an image of one frame; and an insertion ratio calculator configured to calculate an insertion ratio of a padding code, the padding code being inserted into the payload to fill a difference between a transmission rate of the pixel data that is inputted to the transmission unit and a transmission rate of the pixel data that is outputted from the transmission unit to the transmission channel.

11 Claims, 15 Drawing Sheets

(56) References Cited

FOREIGN PATENT DOCUMENTS

WO     WO-2021100602 A1 * 5/2021 ............. H04L 69/22

OTHER PUBLICATIONS

IEEE Computer Society: "1394b IEEE Standard for a High-Performance Serial Bus—Amendment 2", IEEE STD 1394BTM-2002, XX, XX, Dec. 14, 2002 (Dec. 14, 2002), pp. 1-34,145, XP002297140,* abstract * * chapter 17 * * figures 17-7 *.

* cited by examiner

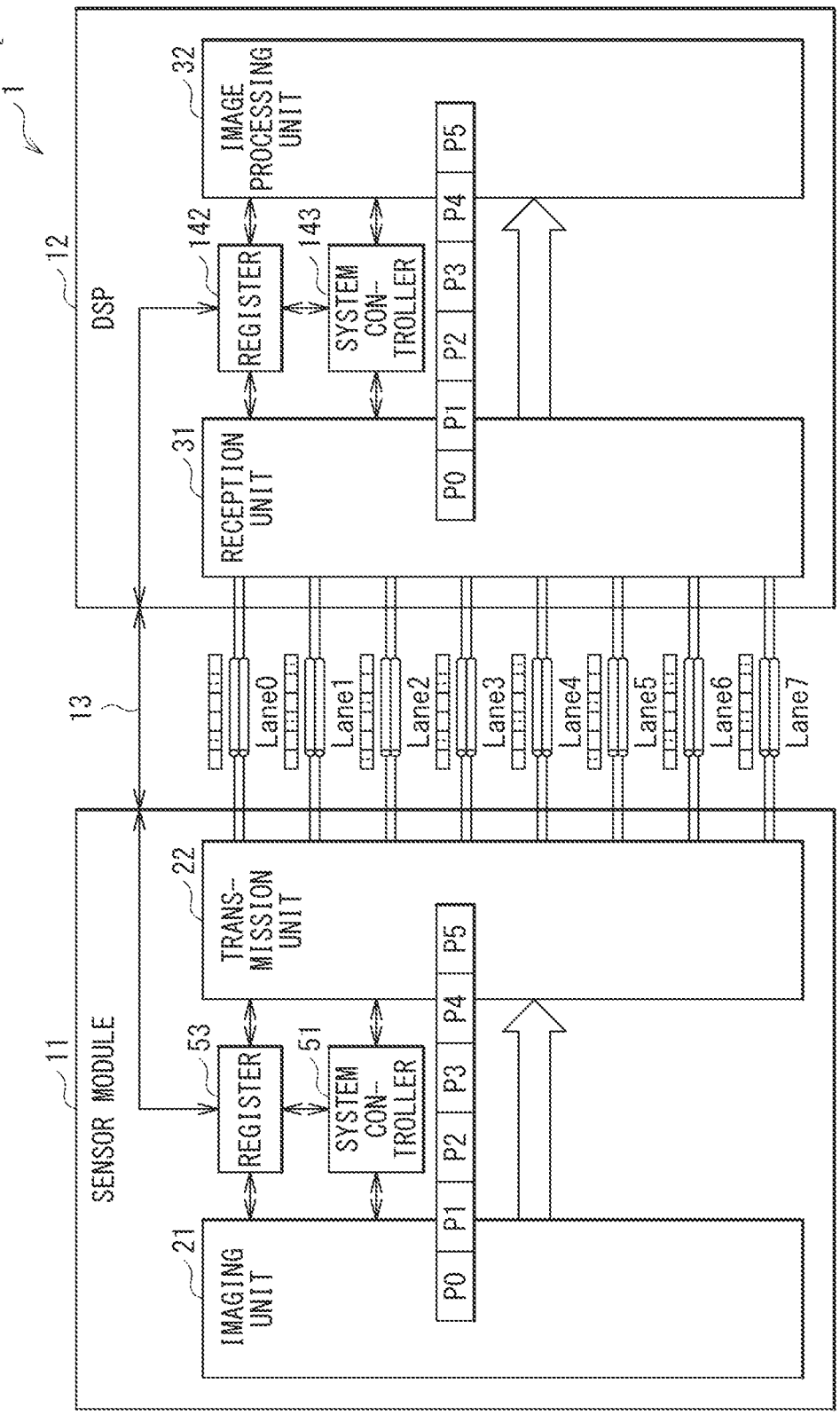

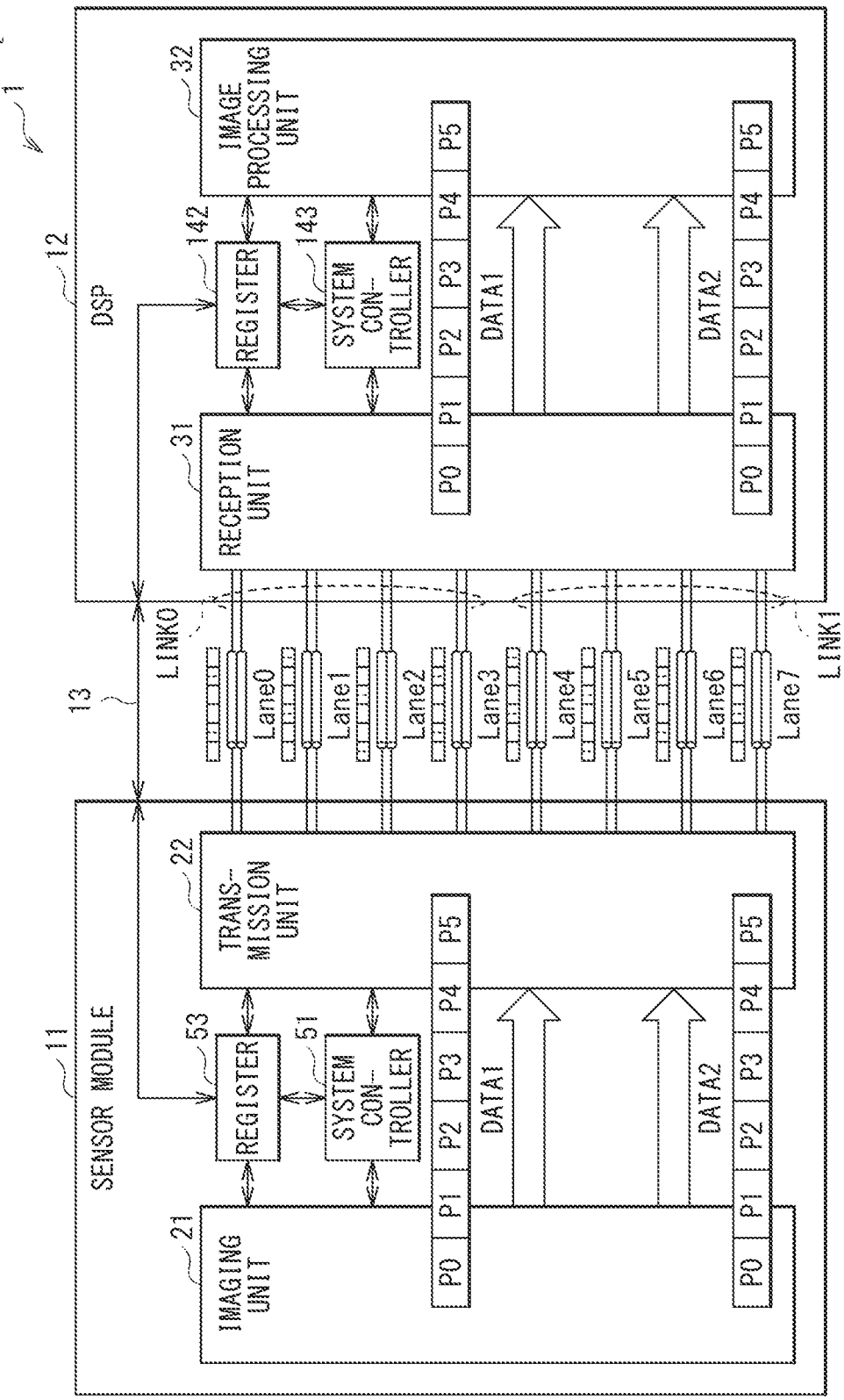

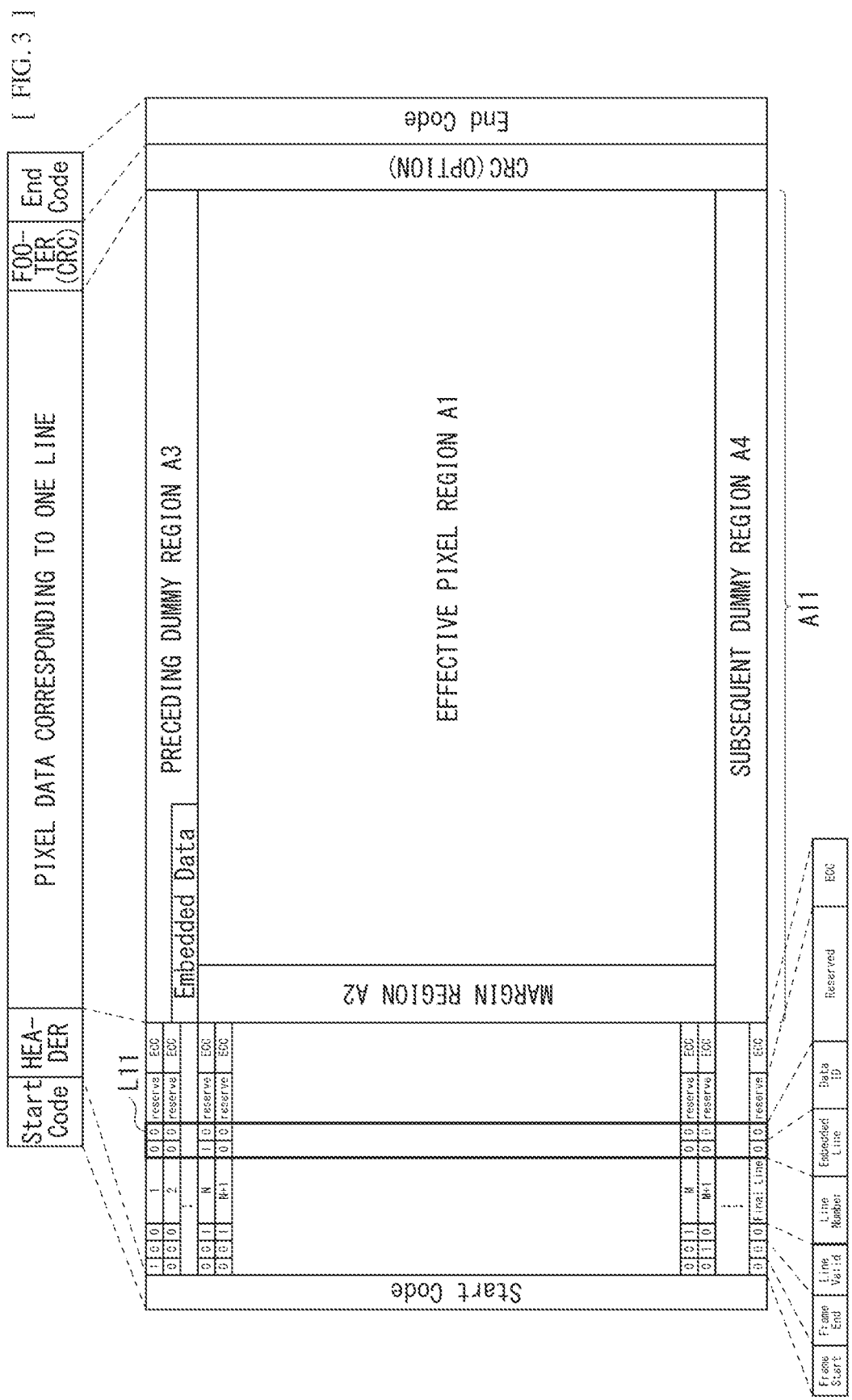

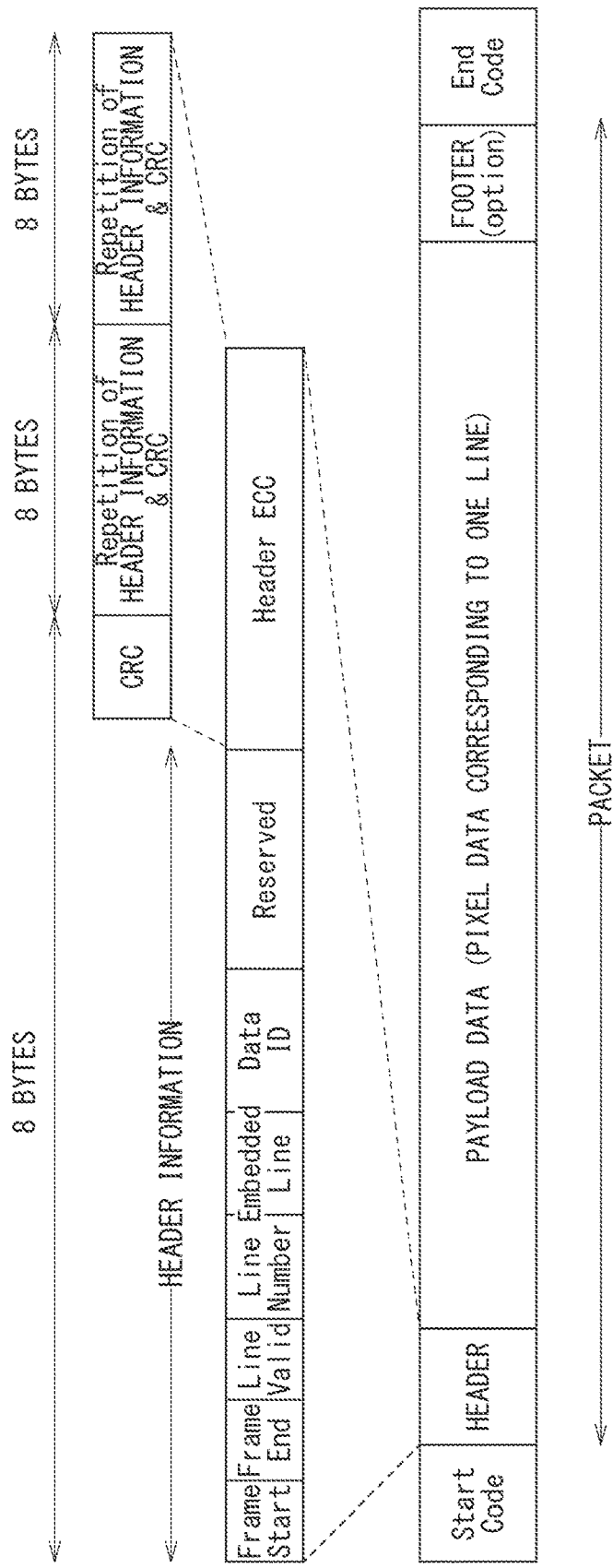
[FIG. 4]

[FIG. 5]

| MAJOR ITEM | MINOR ITEM | AMOUNT OF INFORMATION | CONTENT |
|---|---|---|---|
| FRAME INFORMATION | Frame Start | 1bit | INDICATING START OF FRAME (E.G., FIRST LINE) |
| | Frame End | 1bit | INDICATING END OF FRAME (E.G., LINE BEFORE SUBSEQUENT DUMMY) |
| LINE INFORMATION | Line Valid | 1bit | INDICATING WHETHER LINE IS VALID OR INVALID |
| | Line Number | 13bit | INDICATING LINE NUMBER |
| | Embedded Line | 1bit | INDICATING EMBEDDED LINE NUMBER |
| DATA INFORMATION | Data ID | Pbit | INDICATING DATA IDENTIFICATION |
| OTHERS | Reserved | 31-Pbit | RESERVED FOR FUTURE EXTENSIBILITY |
| | Header ECC | 18byte | ECC OF HEADER INFORMATION |

[FIG. 6]
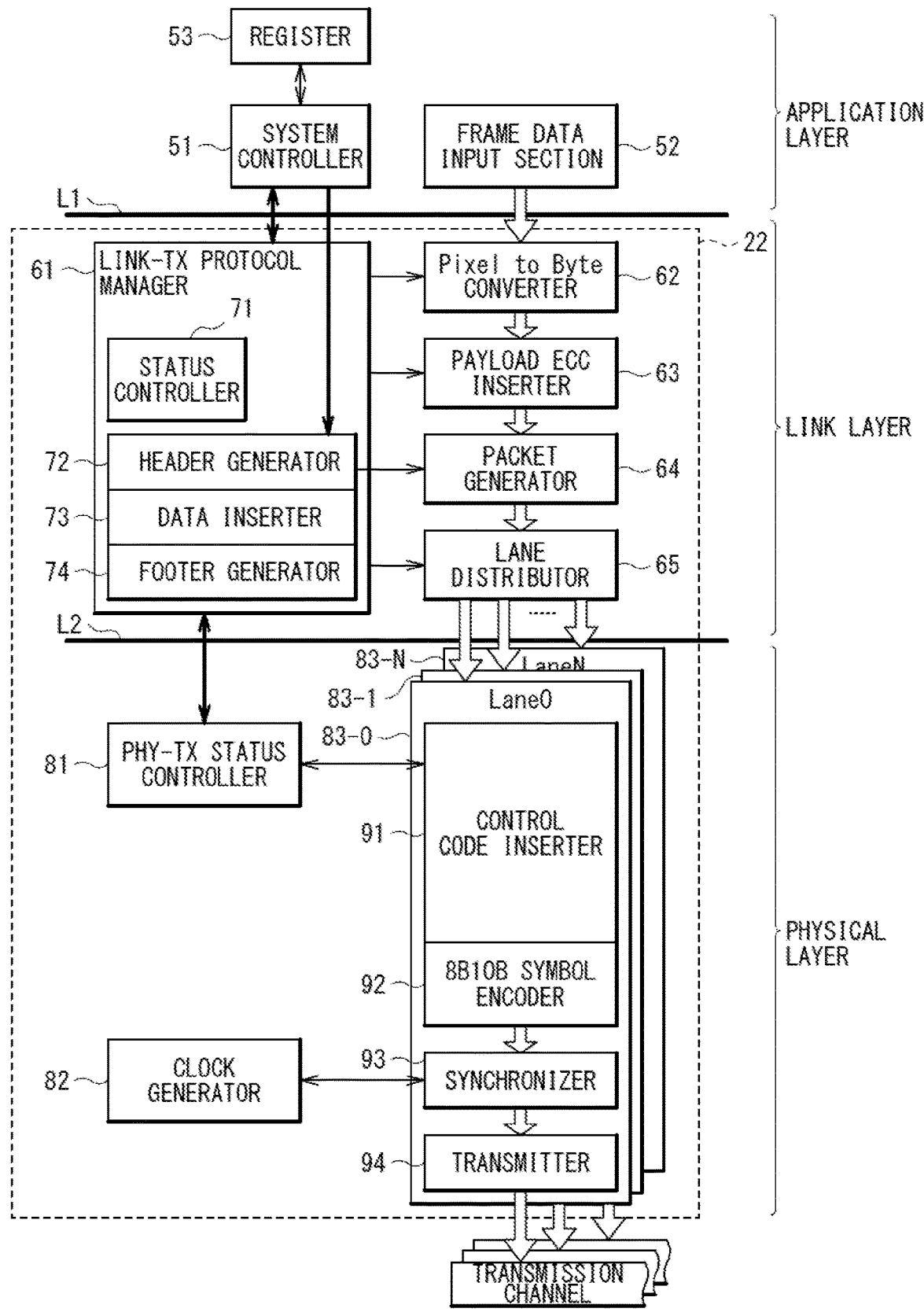

[FIG. 7]
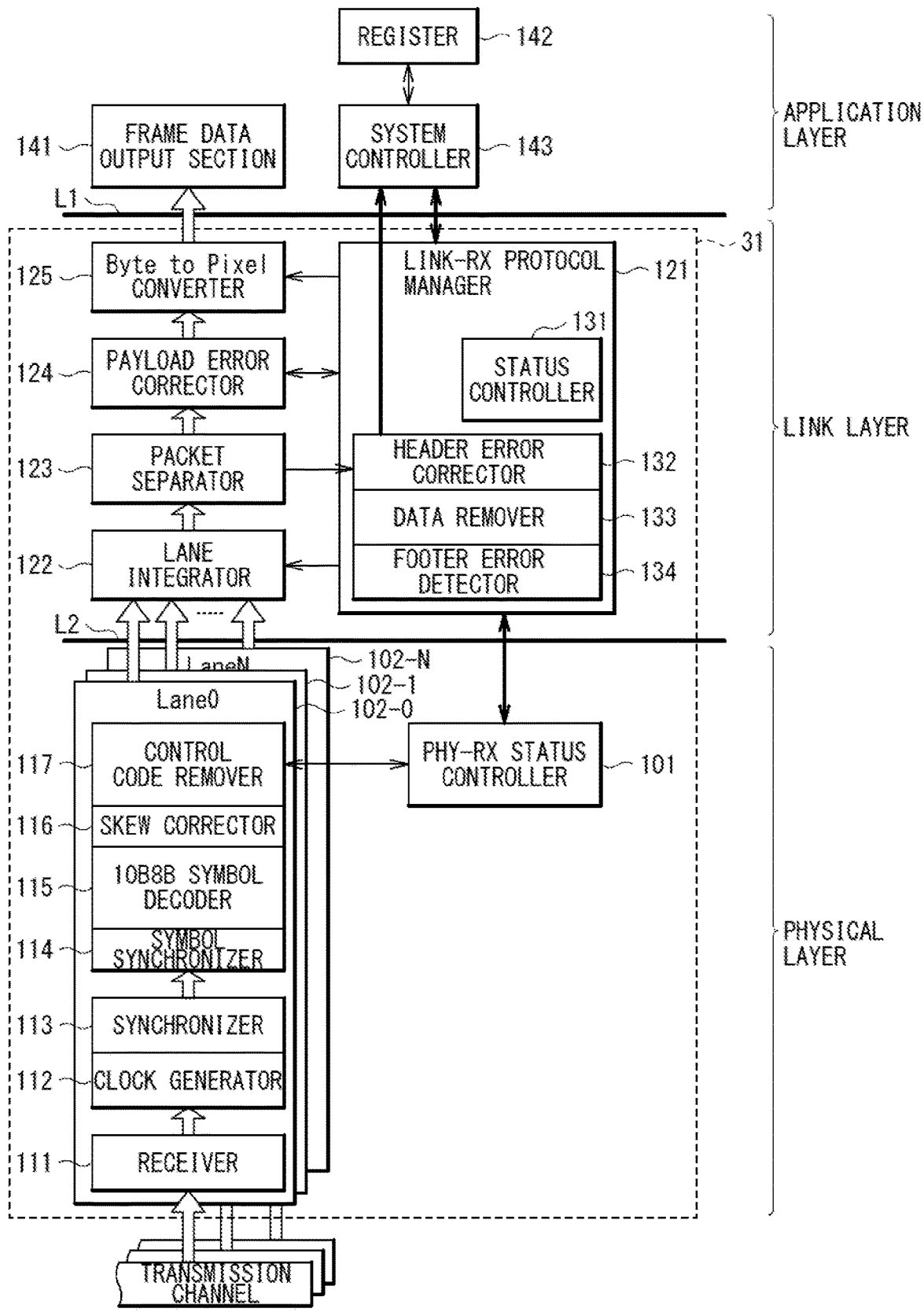

[ FIG. 8 ]

| PHY CONTROL CODE | APPLICATION | 8B10B SYMBOL CONFIGURATION | | | |
|---|---|---|---|---|---|
| Idle Code | SYMBOL GROUP USED TO KEEP TOGGLING OUTPUT SIGNAL IN PERIOD OTHER THAN DURING PACKET TRANSMISSION (E.G., MARGIN PERIOD) | D00.0 | | | |
| Start Code | INDICATING START OF PACKET (LINE/H) | K28.5 | K27.7 | K28.2 | K27.7 |
| End Code | INDICATING END OF PACKET (LINE/H) | K28.5 | K29.7 | K30.7 | K29.7 |
| Pad Code | Padding SYMBOL GROUP INSERTED TO FILL DIFFERENCE BETWEEN PIXEL DATA (PAYLOAD DATA) BAND AND PHY TRANSMISSION BAND | K23.7 | K28.4 | K28.6 | K28.7 |
| Sync Code | SYMBOL GROUP USED TO ACHIEVE BIT SYNCHRONIZATION AND 8B10B SYMBOL SYNCHRONIZATION OF I/F | K28.5 | Any** | ← | ← |
| Deskew Code | SYMBOL GROUP USED AS MARKING TO MATCH Data Skew BETWEEN LANES | K28.5 | Any** | ← | ← |
| Standby Code | SYMBOL GROUP USED TO NOTIFY RX SIDE THAT TX OUTPUT BECOMES High-Z | K28.5 | Any** | ← | ← |

[ FIG. 9 ]

Control Symbol

| Code | 8B<br>HGF_EDCBA | 10B<br>abcdei_fghj | | memo |
|------|------|------|------|------|
| | | RD- | RD+ | |
| K23.7 | 11110111 | 1110101000 | 0001010111 | Used in Pad Code |
| K27.7 | 11111011 | 1101101000 | 0010010111 | Used in Start Code |
| K28.0 | 00011100 | 0011110100 | 1100001011 | Reserved |
| K28.1 | 00111100 | 0011111001 | 1100000110 | Reserved |
| K28.2 | 01011100 | 0011110101 | 1100001010 | Used in Start Code |
| K28.3 | 01111100 | 0011110011 | 1100001100 | Reserved |
| K28.4 | 10011100 | 0011110010 | 1100001101 | Used in Pad Code |
| K28.5 | 10111100 | 0011111010 | 1100000101 | Comma Character |
| K28.6 | 11011100 | 0011110110 | 1100001001 | Used in Pad Code |
| K28.7 | 11111100 | 0011111000 | 1100000111 | Used in Pad Code |
| K29.7 | 11111101 | 1011101000 | 0100010111 | Used in End Code |
| K30.7 | 11111110 | 0111101000 | 1000010111 | Used in End Code |

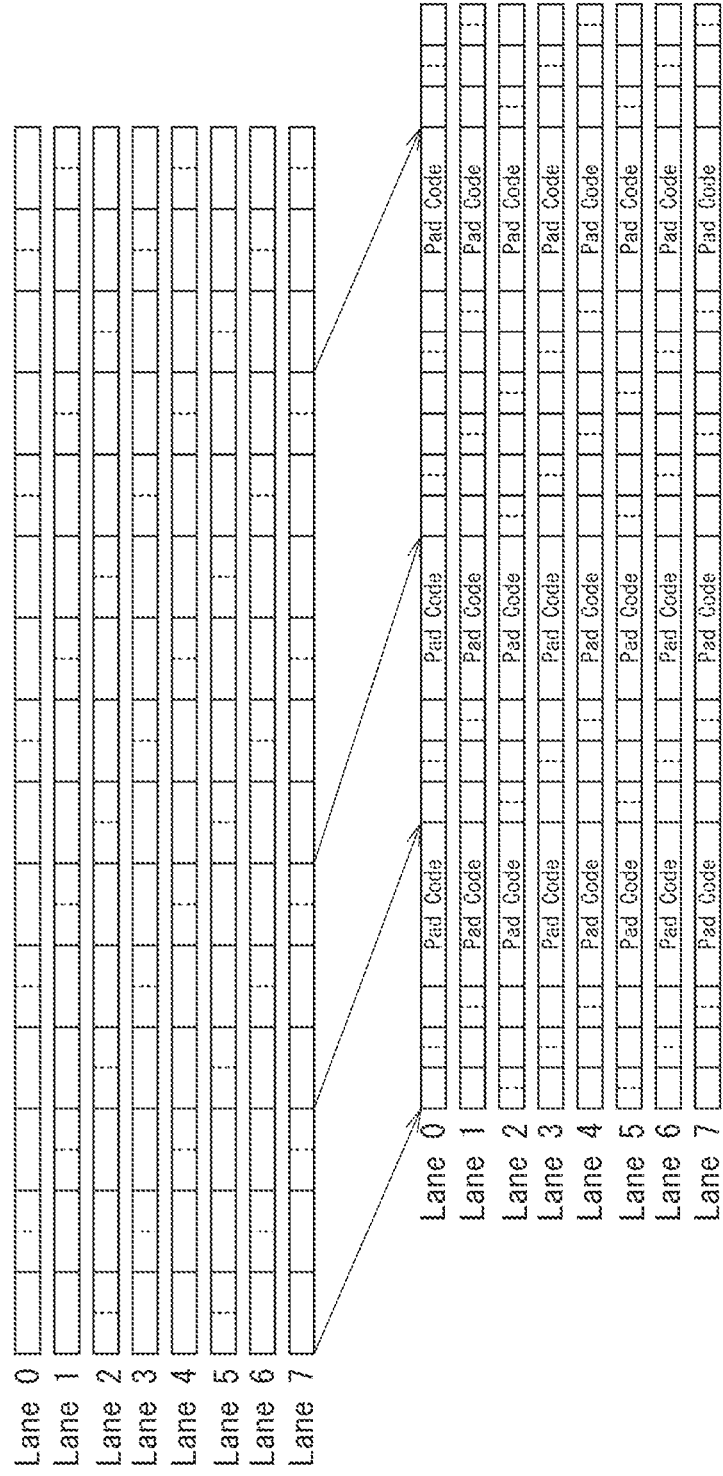
[ FIG. 10 ]

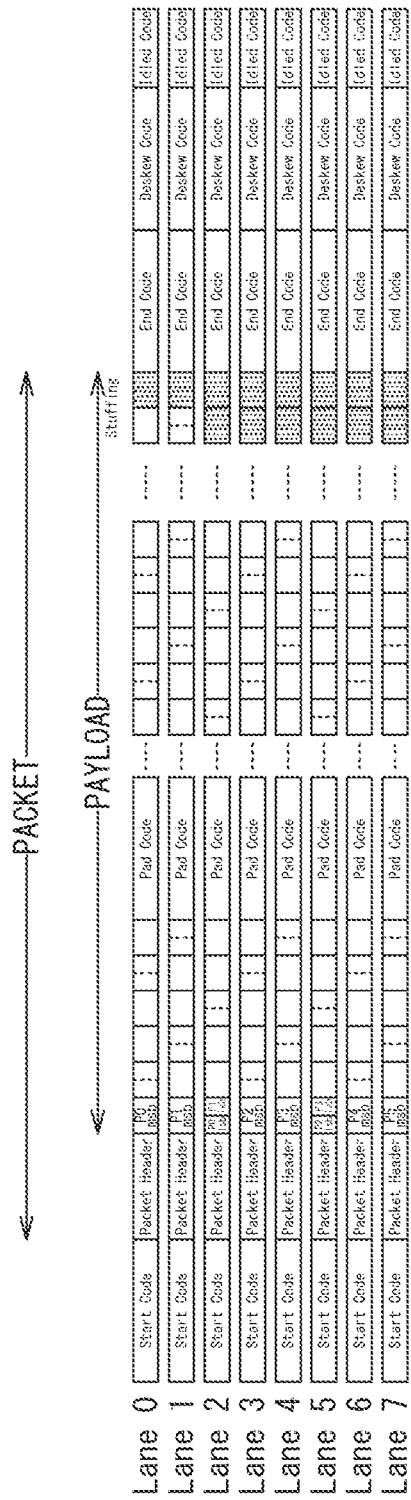
[FIG. 11]

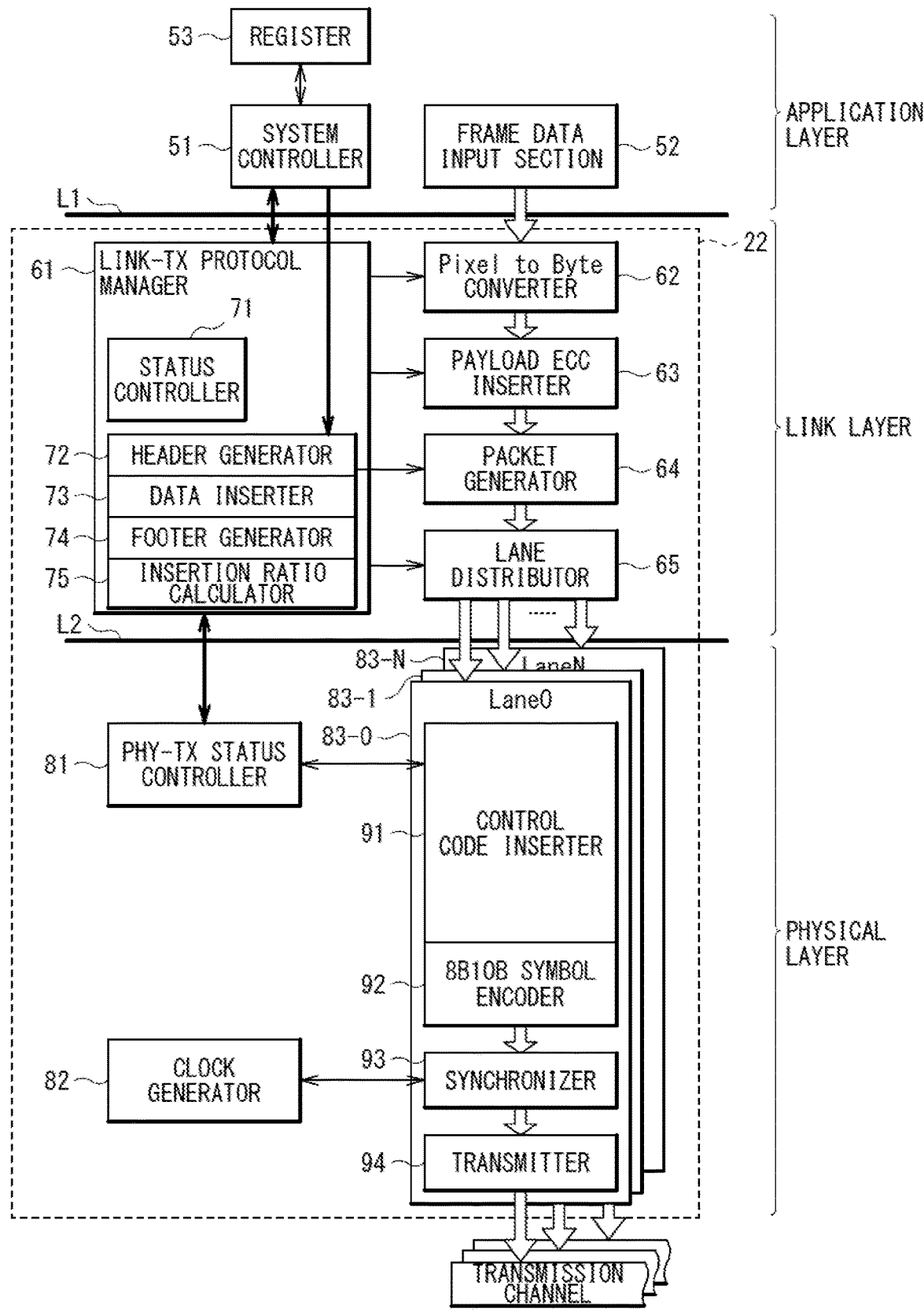
[FIG. 12]

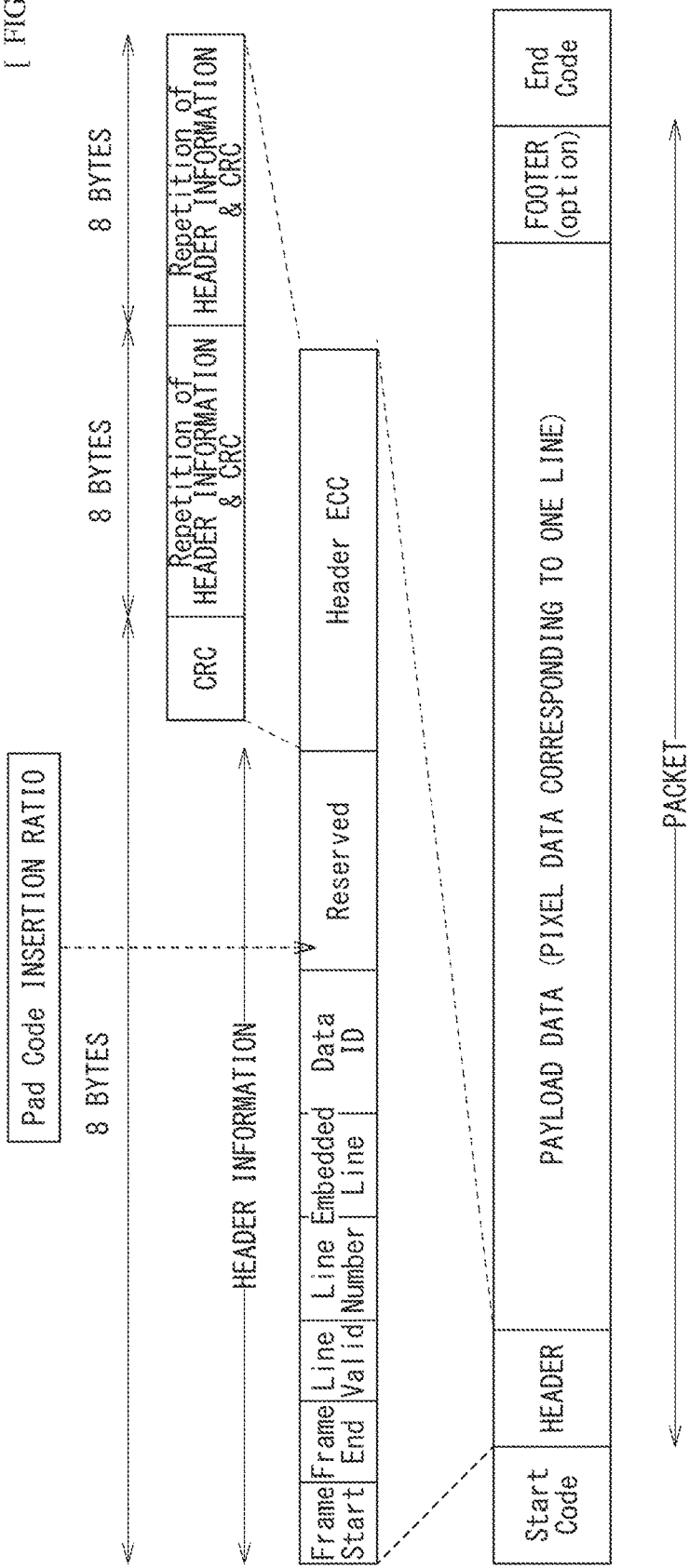
[ FIG. 13 ]

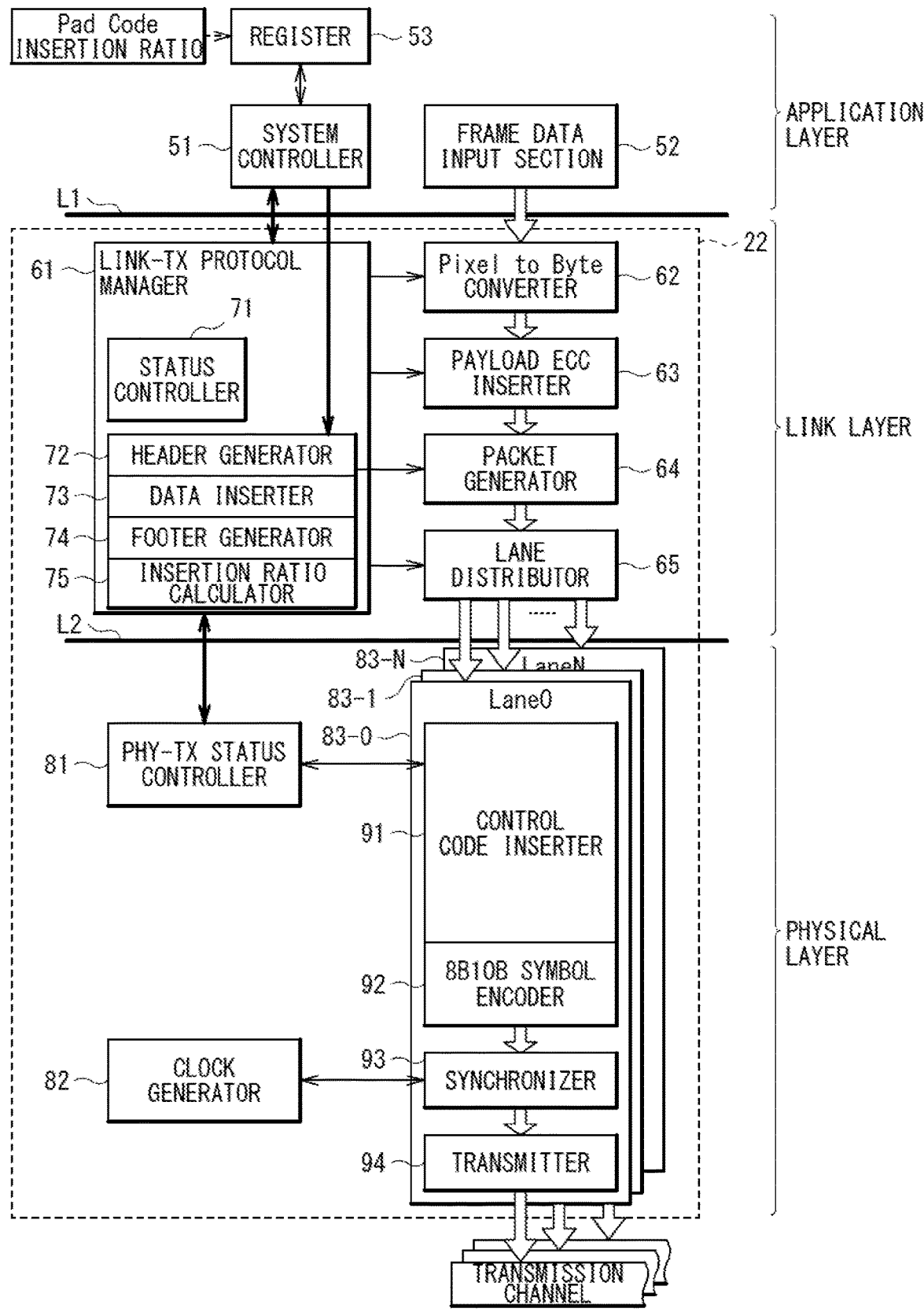
[FIG. 14]

[FIG. 15]
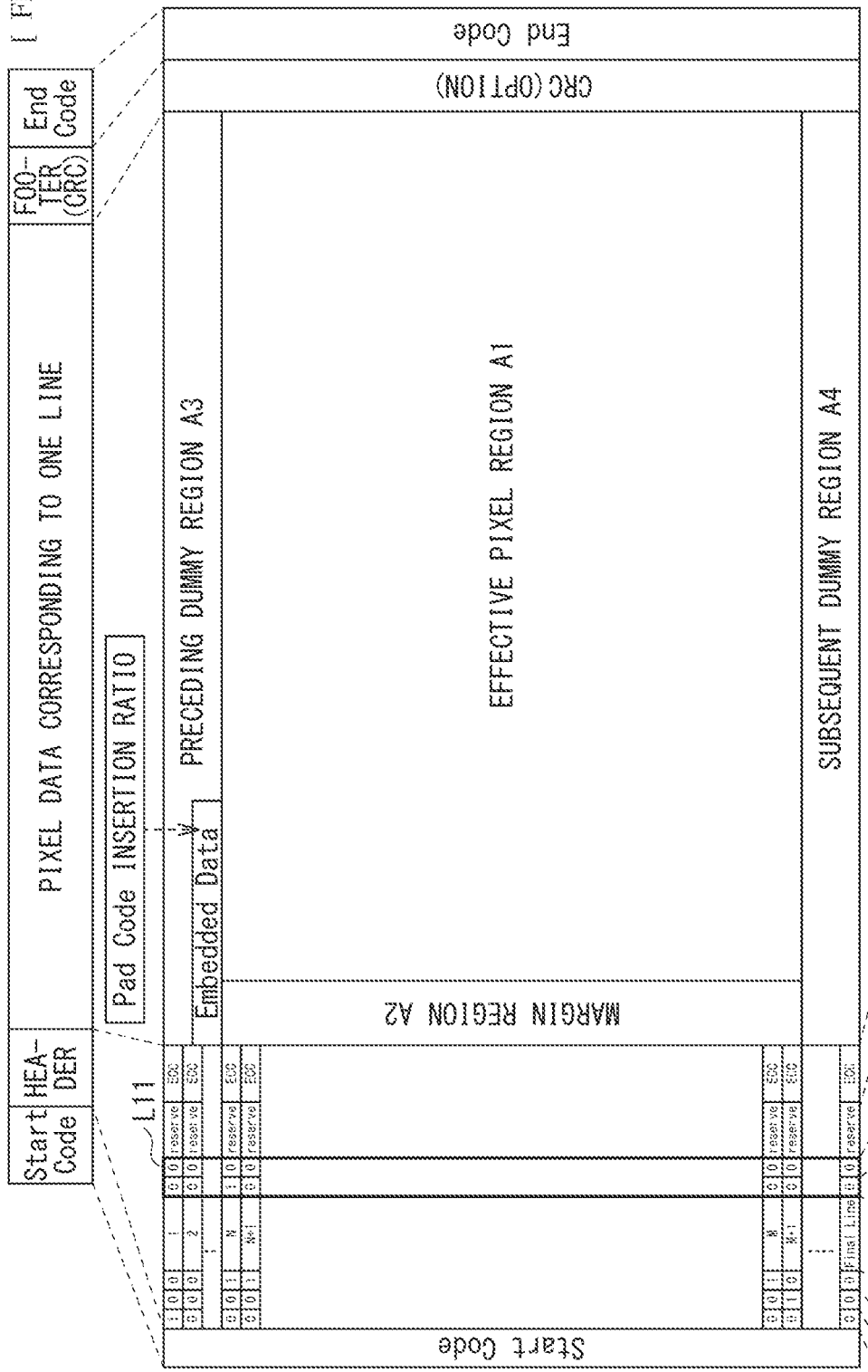

TRANSMISSION DEVICE, RECEPTION DEVICE, AND TRANSMISSION SYSTEM WITH PADDING CODE INSERTION

TECHNICAL FIELD

The present disclosure relates to a transmission device that transmits image data, a reception device that receives image data, and a transmission system that transmits and receives image data.

BACKGROUND ART

Some transmission systems transmit and receive, between a transmission unit and a reception unit, image data that includes pixel data corresponding to a plurality of lines and is outputted from an imaging unit. PTL 1 discloses a transmission system that generates packets, and transmits and receives image data by using the packets. The packet includes a header including control information and a payload including pixel data corresponding to one line. The technique disclosed in PTL 1 enables a symbol group called a padding (Padding) code to be inserted into payload data, to fill a transmission band difference between a transmission rate of pixel data that is inputted to a transmission unit (a pixel data band) and a transmission rate of pixel data that is transmitted from the transmission unit to be inputted to a reception unit (a PHY transmission band).

CITATION LIST

Patent Literature

PTL 1: Japanese Unexamined Patent Application Publication No. 2012-120158

SUMMARY OF THE INVENTION

In the technique disclosed in PTL 1, it is difficult to find an insertion ratio of the padding code described above on the reception unit side, which can make it difficult to perform optimum data processing.

It is desirable to provide a transmission device, a reception device, and a transmission system that make it possible to perform optimum data processing.

A transmission device according to one embodiment of the present disclosure includes: a transmission unit configured to output, to a transmission channel, a plurality of packets each including a payload and a header added to the payload, the payload including pixel data corresponding to one line included in an image of one frame; and an insertion ratio calculator configured to calculate an insertion ratio of a padding code, the padding code being inserted into the payload to fill a difference between a transmission rate of the pixel data that is inputted to the transmission unit and a transmission rate of the pixel data that is outputted from the transmission unit to the transmission channel.

A reception device according to one embodiment of the present disclosure includes a reception unit configured to receive a plurality of packets each including a payload and a header added to the payload from a transmission unit of a transmission device via a transmission channel, the payload including pixel data corresponding to one line included in an image of one frame. The reception device is configured to receive data on an insertion ratio of a padding code from the transmission device, the padding code being inserted into the payload to fill a difference between a transmission rate of the pixel data that is inputted to the transmission unit and a transmission rate of the pixel data that is outputted from the transmission unit to the transmission channel.

A transmission system according to one embodiment of the present disclosure includes: a transmission device; and a reception device. The transmission device includes a transmission unit configured to output, to a transmission channel, a plurality of packets each including a payload and a header added to the payload, the payload including pixel data corresponding to one line included in an image of one frame, and an insertion ratio calculator configured to calculate an insertion ratio of a padding code, the padding code being inserted into the payload to fill a difference between a transmission rate of the pixel data that is inputted to the transmission unit and a transmission rate of the pixel data that is outputted from the transmission unit to the transmission channel.

The transmission device, the reception device, or the transmission system according to one embodiment of the present disclosure makes it possible to find the insertion ratio of the padding code.

BRIEF DESCRIPTION OF DRAWINGS

FIG. 1 is a block diagram illustrating a first configuration example of a transmission system according to one embodiment of the present disclosure.

FIG. 2 is a block diagram illustrating a second configuration example of the transmission system according to one embodiment.

FIG. 3 is an explanatory diagram illustrating an example of a frame format in the transmission system according to one embodiment.

FIG. 4 is an explanatory diagram illustrating an example of a header structure of one packet of the frame format illustrated in FIG. 3.

FIG. 5 is an explanatory diagram illustrating an example of contents of header information in the header structure illustrated in FIG. 4.

FIG. 6 is a block diagram illustrating a configuration example of a transmission unit in the transmission system according to one embodiment.

FIG. 7 is a block diagram illustrating a configuration example of a reception unit in the transmission system according to one embodiment.

FIG. 8 is an explanatory diagram illustrating an example of control codes that are added by a control code inserter of the transmission unit in the transmission system according to one embodiment.

FIG. 9 is an explanatory diagram illustrating an example of values of K Characters.

FIG. 10 is an explanatory diagram illustrating a Pad Code insertion example.

FIG. 11 is an explanatory diagram illustrating an example of packet data into which the control codes have been inserted.

FIG. 12 is a block diagram illustrating a first example of an improvement example of the transmission unit in the transmission system according to one embodiment.

FIG. 13 is an explanatory diagram illustrating an example in which data indicating a Pad Code insertion ratio is added to a header.

FIG. 14 is a block diagram illustrating a second example of the improvement example of the transmission unit in the transmission system according to one embodiment.

FIG. 15 is a block diagram illustrating a third example of the improvement example of the transmission unit in the transmission system according to one embodiment.

MODES FOR CARRYING OUT THE INVENTION

In the following, description is given of embodiments of the present disclosure in detail with reference to the drawings. It is to be noted that the description is given in the following order.

1. One Embodiment 1.1 Configuration and Operation of Transmission System According to One Embodiment (FIG. 1 to FIG. 11)
1.2 Improvement Example of Transmission System According to One Embodiment (FIG. 12 to FIG. 15)
1.3 Effects 2. Other Embodiments <1. One Embodiment>
[1.1 Configuration and Operation of Transmission System According to One Embodiment]

Configuration Example of Transmission System

FIG. 1 illustrates a first configuration example of a transmission system 1 according to one embodiment of the present disclosure.

The transmission system 1 illustrated in FIG. 1 includes a sensor module 11 and a DSP (Digital Signal Processor) 12. The sensor module 11 and the DSP 12 include LSIs (Large Scale Integrated Circuits) different from each other, for example, and are provided in the same imaging device having an imaging function, such as a digital camera or a mobile phone.

The sensor module 11 includes an imaging unit 21 and a transmission unit 22. In addition, the sensor module 11 includes a system controller 51 and a register 53. In addition, the sensor module 11 includes a frame data input section 52 to be described later (FIG. 6). The system controller 51 and the register 53 are coupled to the imaging unit 21 and the transmission unit 22.

The DSP 12 includes a reception unit 31 and an image processing unit 32. In addition, the DSP 12 includes a register 142 and a system controller 143. In addition, the DSP 12 includes a frame data output section 141 to be described later (FIG. 7). The register 142 and the system controller 143 are coupled to the reception unit 31 and the image processing unit 32.

The system controller 51 and the register 53 in the sensor module 11, and the register 142 and the system controller 143 in the DSP 12 are coupled to each other by a control line 13. This enables communication of control data, etc. between the sensor module 11 and the DSP 12.

The imaging unit 21 includes an image sensor such as a CMOS (Complementary Metal Oxide Semiconductor), and performs photoelectric conversion of light received via a lens. In addition, the imaging unit 21 performs A/D conversion, etc. of signals obtained by the photoelectric conversion, and outputs pixel data included in an image of one frame to the transmission unit 22, by outputting data of each one pixel in order.

The transmission unit 22 assigns the data of each pixel supplied from the imaging unit 21 to a plurality of transmission channels, for example, in the order in which the data is supplied from the imaging unit 21. The transmission unit 22 transmits the data of each pixel to the DSP 12 in parallel via the plurality of transmission channels. In the example of FIG. 1, eight transmission channels are used to perform transmission of the pixel data. The transmission channel between the sensor module 11 and the DSP 12 may be a wired transmission channel, or may be a wireless transmission channel. Hereinafter, the transmission channel between the sensor module 11 and the DSP 12 will be referred to as a lane (Lane) as appropriate.

The reception unit 31 of the DSP 12 receives the pixel data transmitted from the transmission unit 22 via the eight lanes, and outputs the data of each pixel to the image processing unit 32 in order.

The image processing unit 32 generates an image of one frame on the basis of the pixel data supplied from the reception unit 31, and performs various kinds of image processing by using the generated image. Image data transmitted from the sensor module 11 to the DSP 12 is RAW data, and is subjected, in the image processing unit 32, to various kinds of processing, such as compression of the image data, display of the image, and recording of the image data on a recording medium.

FIG. 2 illustrates a second configuration example of the transmission system 1 according to one embodiment.

The imaging unit 21 may be configured to output, for the same pixel, a plurality of pieces of pixel data of different types from each other. For example, as data of the same pixel, two pieces of pixel data of different types (first pixel data DATA1 and second pixel data DATA2) may be outputted, as illustrated in FIG. 2. For example, for the same pixel, two pieces of pixel data with different gains may be outputted. In this case, the two pieces of pixel data may be configured to be transmitted in parallel, for example, between the transmission unit 22 and the reception unit 31. For example, of Lanes 0 to 7, Lanes 0 to 3 may be configured to be assigned as a first split transmission channel (LINK0) that transmits the first pixel data DATA1, and Lanes 4 to 7 may be configured to be assigned as a second split transmission channel (LINK1) that transmits the second pixel data DATA2. In this manner, to transmit pixel data of different types in parallel, for example, between the transmission unit 22 and the reception unit 31, a configuration may be used in which a plurality of lanes are split into a plurality of split transmission channels (LINK) for the respective types of pixel data.

It is to be noted that the transmission system 1 may be provided with a plurality of transmission units 22 and a plurality of reception units 31. In this case, for example, image data of one frame or a plurality of frames captured by one imaging unit 21 may be split to be inputted to the plurality of transmission units in parallel, and the image data of the one frame or the plurality of frames inputted in parallel may be transmitted to the plurality of reception units 31 in parallel. Then, the image data of the one frame or the plurality of frames received in parallel may be outputted from the plurality of reception units 31 to the DSP 12 in parallel.

As described above, the sensor module 11 of the transmission system 1 may be provided with one or a plurality of transmission units 22 that transmits captured image data of one frame or a plurality of frames. On the other hand, the DSP 12 may be provided, in correspondence with the transmission unit 22 of the sensor module 11, with one or a plurality of reception units 31 that receives the image data of the one frame or the plurality of frames transmitted from the sensor module 11.

The following description is based on data transmission in the transmission system 1 of FIG. 1 in which the sensor module 11 is provided with one transmission unit 22 and the DSP 12 is provided with one reception unit 31. Data transmission is similarly performed also between each of the plurality of transmission units 22 and each of the plurality of reception units 31.

[Frame Format]

FIG. 3 illustrates an example of a frame format that is used to transmit image data of one frame between the sensor module 11 and the DSP 12.

An effective pixel region A1 is a region of effective pixels of an image of one frame captured by the imaging unit 21. On the left side of the effective pixel region A1 is set a margin region A2 in which the number of pixels in a vertical direction is the same as the number of pixels in the vertical direction of the effective pixel region A1.

On the upper side of the effective pixel region A1 is set a preceding dummy region A3 in which the number of pixels in a horizontal direction is the same as the total number of pixels in the horizontal direction of the effective pixel region A1 and the margin region A2. In the example of FIG. 3, Embedded Data is inserted in the preceding dummy region A3. Embedded Data includes information on setting values related to the imaging by the imaging unit 21, such as a shutter speed, an aperture, and a gain. Embedded Data may be inserted in a subsequent dummy region A4.

On the lower side of the effective pixel region A1 is set the subsequent dummy region A4 in which the number of pixels in the horizontal direction is the same as the total number of pixels in the horizontal direction of the effective pixel region A1 and the margin region A2.

The effective pixel region A1, the margin region A2, the preceding dummy region A3, and the subsequent dummy region A4 are included in an image data region A11.

A header is added before each line included in the image data region A11, and Start Code is added before the header. In addition, a footer is added optionally after each line included in the image data region A11, and a control code to be described later, such as End Code, is added after the footer. In a case where the footer is not added, the control code such as End Code is added after each line included in the image data region A11.

Each time an image of one frame captured by the imaging unit 21 is transmitted from the sensor module 11 to the DSP 12, the whole data of the format illustrated in FIG. 3 is transmitted as transmission data.

A strip on the upper side of FIG. 3 illustrates a structure of a packet that is used for transmission of the transmission data illustrated on the lower side. Assuming that pixels arranged in the horizontal direction are a line, a payload of the packet stores data of the pixels included in one line of the image data region A11. Transmission of the whole image data of one frame is performed by using packets whose number is equal to or greater than the number of pixels in the vertical direction of the image data region A11.

One packet is configured by adding a header and a footer to the payload where the pixel data corresponding to one line is stored. As will be described in detail later, the header includes additional information of the pixel data stored in the payload, such as Frame Start, Frame End, Line Valid, Line Number, Reserved, and ECC. In addition, the header includes Embedded Line and Data ID, as enclosed by a bold line L11. Start Code and End Code that are control codes are at least added to each packet.

In this manner, the format of transmitting, for each line, the pixel data included in the image of one frame is adopted. This makes it possible to transmit the additional information, such as the header, and the control codes, such as Start Code and End Code, during a blanking period for each line.

FIG. 4 illustrates an example of a header structure of one packet of the frame format illustrated in FIG. 3. FIG. 5 illustrates an example of contents of header information in the header structure illustrated in FIG. 4.

As described above, one packet includes a header and payload data that is pixel data corresponding to one line. A footer may be added to the packet. The header includes header information and Header ECC. Start Code is added at the start of each packet, and End Code is added after each packet.

The header information includes Frame Start, Frame End, Line Valid, Line Number, and Reserved. The header information further includes Embedded Line serving as line information and Data ID serving as data identification. FIG. 5 illustrates contents and amounts of information of the respective pieces of information.

Frame Start is 1-bit information indicating the start of a frame. A value of 1 is set for Frame Start of the header of the packet that is used to transmit the pixel data of the first line of the image data region A11 in FIG. 3, and a value of 0 is set for Frame Start of the header of the packet that is used to transmit the pixel data of another line.

Frame End is 1-bit information indicating the end of the frame. A value of 1 is set for Frame End of the header of the packet including the pixel data of the end line of the effective pixel region A1 in the payload, and a value of 0 is set for Frame End of the header of the packet that is used to transmit the pixel data of another line.

Frame Start and Frame End serve as frame information that is information related to the frame.

Line Valid is 1-bit information indicating whether or not the line of the pixel data stored in the payload is a line of effective pixels. A value of 1 is set for Line Valid of the header of the packet that is used to transmit the pixel data of a line in the effective pixel region A1, and a value of 0 is set for Line Valid of the header of the packet that is used to transmit the pixel data of another line.

Line Number is 13-bit information indicating a line number of the line including the pixel data stored in the payload.

Line Valid and Line Number serve as line information that is information related to the line.

Embedded Line is 1-bit information indicating whether or not the packet is a packet that is used to transmit the line including Embedded Data inserted. For example, a value of 1 is set for Embedded Line of the header of the packet that is used to transmit the line including Embedded Data, and a value of 0 is set for Embedded Line of the header of the packet that is used to transmit another line. As described above, information on setting values related to the imaging is inserted, as Embedded Data, in a predetermined line of the preceding dummy region A3 or the subsequent dummy region A4.

Data ID is P-bit information indicating a number of the pixel data stored in the payload. P bits represent a predetermined number of bits equal to or greater than 1 bit.

Reserved is a region of 31-P bits for extension. An amount of data of the whole header information is 6 bytes.

As illustrated in FIG. 4, Header ECC disposed subsequent to the header information includes a CRC (Cyclic Redundancy Check) code that is a 2-byte error detection code calculated on the basis of the 6-byte header information. In addition, Header ECC includes, subsequent to the CRC code, two pieces of the same information as 8-byte information that is a set of the header information and the CRC code.

That is, the header of one packet includes three same sets of the header information and the CRC code. The amount of data of the whole header is 8 bytes of a first set of the header information and the CRC code, 8 bytes of a second set of the header information and the CRC code, and 8 bytes of a third set of the header information and the CRC code, i.e., 24 bytes in total.

[Configuration of Transmission Unit 22 and Reception Unit 31]

FIG. 6 illustrates a configuration example of the transmission unit 22 in the transmission system 1. FIG. 7 illustrates a configuration example of the reception unit 31 in the transmission system 1.

The transmission unit 22 and the reception unit 31 each include a configuration of a link layer and a configuration of a physical layer. In FIG. 6 and FIG. 7, a configuration illustrated above a solid line L2 is the configuration of the link layer, and a configuration illustrated below the solid line L2 is the configuration of the physical layer.

It is to be noted that a configuration illustrated above a solid line L1 is a configuration of an application layer. The application layer includes the system controller 51, the frame data input section 52, and the register 53, and includes the frame data output section 141, the register 142, and the system controller 143. The frame data input section 52 is provided in the imaging unit 21, for example. The frame data output section 141 is provided in the image processing unit 32, for example.

The system controller 51 communicates with a LINK-TX protocol manager 61 of the transmission unit 22, and controls transmission of image data by, for example, providing information related to the frame format.

The frame data input section 52 performs imaging in response to a user's instruction, etc., and supplies data of each pixel included in an image obtained by performing the imaging to a Pixel to Byte converter 62 of the transmission unit 22.

The register 53 stores information such as the number of bits of Pixel to Byte conversion and the number of Lanes. Image data transmission processing is performed in accordance with the information stored in the register 53.

The frame data output section 141 generates an image of one frame on the basis of the pixel data of each line supplied from the reception unit 31, and outputs the image. Various kinds of processing is performed by using the image outputted from the frame data output section 141.

The register 142 stores various kinds of setting values related to reception of image data, such as the number of bits of Byte to Pixel conversion and the number of Lanes. Image data reception processing is performed in accordance with the information stored in the register 142.

The system controller 143 communicates with a LINK-RX protocol manager 121, and controls a sequence of a mode change, etc.

[Configuration of Link Layer of Transmission Unit 22]

As illustrated in FIG. 6, the transmission unit 22 is provided with, as the configuration of the link layer, the LINK-TX protocol manager 61, the Pixel to Byte converter 62, a payload ECC inserter 63, a packet generator 64, and a lane distributor 65. The LINK-TX protocol manager 61 includes a status controller 71, a header generator 72, a data inserter 73, and a footer generator 74.

The status controller 71 of the LINK-TX protocol manager 61 manages a status of the link layer of the transmission unit 22.

The header generator 72 generates a header to be added to a payload where pixel data corresponding to one line is stored, and outputs the header to the packet generator 64. An example of the header is illustrated in FIG. 4.

The header generator 72 generates header information under the control of the system controller 51. For example, from the system controller 51, information indicating the line number of pixel data that is outputted by the frame data input section 52, and information indicating the start and the end of a frame are supplied to the header generator 72.

In addition, the header generator 72 calculates a CRC code by applying the header information to a generating polynomial. The generating polynomial of the CRC code to be added to the header information is represented by, for example, the following expression (1):

$$CRC16 = X^{16} + X^{15} + X^2 + 1 \quad (1)$$

The header generator 72 generates a set of the header information and the CRC code by adding the CRC code to the header information, and generates the header by repeatedly disposing three same sets of the header information and the CRC code. The header generator 72 outputs the generated header to the packet generator 64.

The data inserter 73 generates data to be used for stuffing (stuffing), and outputs the data to the Pixel to Byte converter 62 and the lane distributor 65. Payload stuffing data that is the stuffing data supplied to the Pixel to Byte converter 62 is added to pixel data subjected to the Pixel to Byte conversion, and is used to adjust an amount of data of pixel data to be stored in the payload. In addition, lane stuffing data that is the stuffing data supplied to the lane distributor 65 is added to data subjected to lane assignment, and is used to adjust an amount of data between the lanes.

The footer generator 74 calculates, as appropriate, a 32-bit CRC code by applying payload data to a generating polynomial, under the control of the system controller 51, and outputs the CRC code determined by the calculation to the packet generator 64 as a footer. The generating polynomial of the CRC code to be added as the footer is represented by, for example, the following expression (2):

$$CRC32 = X^{32} + X^{31} + X^4 + X^3 + X + 1 \quad (2)$$

The Pixel to Byte converter 62 acquires the pixel data supplied from the frame data input section 52, and performs the Pixel to Byte conversion of converting the data of each pixel into data in 1-byte units. For example, a pixel value (RGB) of each pixel of an image captured by the imaging unit 21 is represented by any number of bits out of 8 bits, 10 bits, 12 bits, 14 bits, and 16 bits.

The Pixel to Byte converter 62 performs the Pixel to Byte conversion for each pixel, for example, in order from the pixel at the left end of a line. In addition, the Pixel to Byte converter 62 generates payload data by adding the payload stuffing data supplied from the data inserter 73 to the pixel data in byte units obtained by the Pixel to Byte conversion, and outputs the payload data to the payload ECC inserter 63.

The pixel data subjected to the Pixel to Byte conversion is grouped into a predetermined number of groups, in the order in which the pixel data is obtained by the conversion. In the link layer of the transmission unit 22, after the grouping is performed in this manner, processing is performed in parallel for the pixel data at the same position in each group, for each period defined by a clock signal. For example, in a case where the pixel data is assigned to 16 groups, the processing of the pixel data is carried out by processing 16 pieces of pixel data arranged in each line within the same period.

As described above, the payload of one packet includes pixel data of one line. Although the processing of the pixel data of the effective pixel region A1 in FIG. 3 is described here, the pixel data of another region, such as the margin region A2, is also processed together with the pixel data of the effective pixel region A1.

After the pixel data corresponding to one line is grouped, the payload stuffing data is added to make each group have the same data length. The payload stuffing data is 1-byte data.

The payload data having such a configuration is supplied from the Pixel to Byte converter 62 to the payload ECC inserter 63.

The payload ECC inserter 63 calculates an error correction code to be used for error correction of the payload data, on the basis of the payload data supplied from the Pixel to Byte converter 62, and inserts a panty that is the error correction code determined by the calculation into the payload data. For example, a Reed-Solomon code is used as the error correction code. It is to be noted that the insertion of the error correction code is optional. For example, it is possible to perform only either one of the insertion of the parity by the payload ECC inserter 63 and the addition of the footer by the footer generator 74.

In the payload ECC inserter 63, basically, a 2-byte parity is generated on the basis of 224 pieces of pixel data, for example, and is inserted subsequent to the 224 pieces of pixel data.

The payload ECC inserter 63 outputs the payload data into which the parity has been inserted to the packet generator 64. In a case where the insertion of the parity is not performed, the payload data supplied from the Pixel to Byte converter 62 to the payload ECC inserter 63 is outputted to the packet generator 64 as it is.

The packet generator 64 generates a packet, by adding the header generated by the header generator 72 to the payload data supplied from the payload ECC inserter 63. In a case where the footer has been generated by the footer generator 74, the packet generator 64 also adds the footer to the payload data.

The packet generator 64 outputs packet data that is data included in the generated one packet to the lane distributor 65. The lane distributor 65 is supplied with: the packet data including the header data and the payload data; the packet data including the header data, the payload data, and the footer data; or the packet data including the header data and the payload data into which the parity has been inserted. The packet structure in FIG. 4 is a logical structure, and in the link layer and the physical layer, data of the packet having the structure in FIG. 4 is processed in units of bytes.

The lane distributor 65 assigns the packet data supplied from the packet generator 64 to each lane to be used for data transmission, out of Lanes 0 to 7, in order from the data at the start.

The lane distributor 65 outputs the packet data assigned to each lane to the physical layer. Although a case of transmitting the data by using the eight lanes of Lanes 0 to 7 is mainly described below, similar processing is performed even in a case where the number of lanes to be used for the data transmission is another number.

[Configuration of Physical Layer of Transmission Unit 22]

As illustrated in FIG. 6, the transmission unit 22 is provided with, as the configuration of the physical layer, a PHY-TX status controller 81, a clock generator 82, and signal processors 83-0 to 83-N. The signal processor 83-0 includes a control code inserter 91, an 8B10B symbol encoder 92, a synchronizer 93, and a transmitter 94. Of the packet data outputted from the lane distributor 65, the packet data assigned to Lane 0 is inputted to the signal processor 83-0, and the packet data assigned to Lane 1 is inputted to the signal processor 83-1. In addition, the packet data assigned to Lane N is inputted to the signal processor 83-N.

In this manner, the physical layer of the transmission unit 22 is provided with the same number of signal processors 83-0 to 83-N as the number of lanes, and processing of the packet data to be transmitted by using each lane is performed in parallel in each of the signal processors 83-0 to 83-N. Although the configuration of the signal processor 83-0 is described, the signal processors 83-1 to 83-N also have a similar configuration.

The PHY-TX status controller 81 controls each unit of the signal processors 83-0 to 83-N. For example, a timing of each processing to be performed by the signal processors 83-0 to 83-N is controlled by the PHY-TX status controller 81.

The clock generator 82 generates a clock signal, and outputs the clock signal to the synchronizer 93 of each of the signal processors 83-0 to 83-N.

The control code inserter 91 of the signal processor 83-0 adds control codes to the packet data supplied from the lane distributor 65. The control code is a code represented by one symbol selected from among a plurality of types of symbols prepared in advance, or by a combination of the plurality of types of symbols. Each symbol inserted by the control code inserter 91 is 8-bit data. By being subjected to 8B10B conversion in a circuit in a subsequent stage, one symbol inserted by the control code inserter 91 becomes 10-bit data. On the other hand, received data is subjected to 10B8B conversion in the reception unit 31 as will be described later; each symbol before the 10B8B conversion included in the received data is 10-bit data, and each symbol after the 10B8B conversion becomes 8-bit data.

The control codes include Start Code, End Code, and the like illustrated in FIG. 4. In addition, the control codes include Idle Code, Pad Code, Sync Code, Deskew Code, and Standby Code.

FIG. 8 illustrates an example of the control codes that are added by the control code inserter 91.

Idle Code is a symbol group that is repeatedly transmitted in a period other than during transmission of the packet data. Idle Code is represented by a D Character D00.0 (00000000), which is an 8B10B Code.

Start Code is a symbol group indicating the start of a packet. As described above, Start Code is added before the packet. Start Code is represented by four symbols of K28.5, K27.7, K28.2, and K27.7, which are three types of K Characters combined. FIG. 9 illustrates an example of a value of each K Character.

End Code is a symbol group indicating the end of the packet. As described above, End Code is added after the packet. End Code is represented by four symbols of K28.5, K29.7, K30.7, and K29.7, which are three types of K Characters combined.

Pad Code is a symbol group called a padding (Padding) code, and is inserted into payload data to fill a difference between a pixel data band and a PHY transmission band. The pixel data band is a transmission rate of pixel data that is outputted from the imaging unit 21 to be inputted to the transmission unit 22, and the PHY transmission band is a transmission rate of pixel data that is transmitted from the transmission unit 22 to be inputted to the reception unit 31. Pad Code is represented by four symbols of K23.7, K28.4, K28.6, and K28.7, which are four types of K Characters combined.

FIG. 10 illustrates a Pad Code insertion example.

An upper stage of FIG. 10 illustrates the payload data assigned to each lane before the Pad Code insertion, and a lower stage thereof illustrates the payload data after the Pad Code insertion. In the example of FIG. 10, Pad Code is inserted, from the start, between the third piece of pixel data and the fourth piece of pixel data, between the sixth piece of pixel data and the seventh piece of pixel data, and between the twelfth piece of pixel data and the thirteenth piece of pixel data. In this manner, Pad Code is inserted at the same position of the payload data on each lane of Lanes 0 to 7.

The insertion of Pad Code into the payload data assigned to Lane 0 is performed by the control code inserter 91 of the signal processor 83-0. The insertion of Pad Code into the payload data assigned to other lanes is also similarly performed at the same timing in each of the signal processors 83-1 to 83-N. The number of Pad Codes is determined on the basis of the difference between the pixel data band and the PHY transmission band, a frequency of the clock signal generated by the clock generator 82, and the like.

In this manner, in a case where the pixel data band is narrow and the PHY transmission band is wide, Pad Code is inserted to adjust a difference between the two bands. For example, by Pad Code being inserted, the difference between the pixel data band and the PHY transmission band is adjusted to fall within a constant range.

Sync Code is a symbol group that is used to achieve bit synchronization and symbol synchronization between the transmission unit 22 and the reception unit 31. Sync Code is represented by two symbols of K28.5 and Any. Any indicates that any type of symbol may be used. Sync Code is repeatedly transmitted, for example, during a training mode before start of transmission of the packet data between the transmission unit 22 and the reception unit 31.

Deskew Code is a symbol group that is used for correction of Data Skew between the lanes, i.e., a discrepancy in reception timing of the data received via each lane of the reception unit 31. Deskew Code is represented by two symbols of K28.5 and Any**. The correction of Data Skew between the lanes using Deskew Code will be described later.

Standby Code is a symbol group that is used to notify the reception unit 31 that an output of the transmission unit 22 enters a status such as High-Z (high impedance), and data transmission is no longer performed. That is, Standby Code is transmitted to the reception unit 31 when the transmission unit 22 ends transmission of the packet data and enters a Standby status. Standby Code is represented by two symbols of K28.5 and Any**.

FIG. 11 illustrates an example of the packet data into which the control codes have been inserted.

As illustrated in FIG. 11, in each of the signal processors 83-0 to 83-N, Start Code is added before the packet data, and Pad Code is inserted into the payload data. End Code is added after the packet data, and Deskew Code is added after End Code. In the example of FIG. 11, Idle Code is added after Deskew Code.

The control code inserter 91 outputs the packet data to which the control codes have been added to the 8B10B symbol encoder 92.

The 8B10B symbol encoder 92 performs the 8B10B conversion on the packet data supplied from the control code inserter 91 (the packet data to which the control codes have been added), and outputs the packet data converted into data in 10-bit units to the synchronizer 93.

The synchronizer 93 outputs each bit of the packet data supplied from the 8B10B symbol encoder 92 to the transmitter 94 in accordance with the clock signal generated by the clock generator 82.

The transmitter 94 transmits the packet data supplied from the synchronizer 93 to the reception unit 31, via the transmission channel included in Lane 0. In a case where the data transmission is performed by using the eight lanes, the packet data is transmitted to the reception unit 31 by using also the transmission channels included in Lanes 1 to 7.

[Configuration of Physical Layer of Reception Unit 31]

As illustrated in FIG. 7, the reception unit 31 is provided with, as the configuration of the physical layer, a PHY-RX status controller 101 and signal processors 102-0 to 102-N. The signal processor 102-0 includes a receiver 111, a clock generator 112, a synchronizer 113, a symbol synchronizer 114, a 10B8B symbol decoder 115, a skew corrector 116, and a control code remover 117. The packet data transmitted via the transmission channel included in Lane 0 is inputted to the signal processor 102-0, and the packet data transmitted via the transmission channel included in Lane 1 is inputted to the signal processor 102-1. In addition, the packet data transmitted via the transmission channel included in Lane N is inputted to the signal processor 102-N.

In this manner, the physical layer of the reception unit 31 is provided with the same number of signal processors 102-0 to 102-N as the number of lanes, and processing of the packet data transmitted by using each lane is performed in parallel in each of the signal processors 102-0 to 102-N. Although the configuration of the signal processor 102-0 is described, the signal processors 102-1 to 102-N also have a similar configuration.

The receiver 111 receives a signal representing the packet data transmitted from the transmission unit 22 via the transmission channel included in Lane 0, and outputs the signal to the clock generator 112.

The clock generator 112 achieves bit synchronization by detecting an edge of the signal supplied from the receiver 111, and generates a clock signal on the basis of the edge detection cycle. The clock generator 112 outputs the signal supplied from the receiver 111 to the synchronizer 113 together with the clock signal.

The synchronizer 113 performs sampling of the signal received by the receiver 111, in accordance with the clock signal generated by the clock generator 112, and outputs the packet data obtained by the sampling to the symbol synchronizer 114. The clock generator 112 and the synchronizer 113 implement a CDR (Clock Data Recovery) function.

The symbol synchronizer 114 achieves symbol synchronization by detecting control codes included in the packet data, or by detecting a part of symbols included in the control codes. For example, the symbol synchronizer 114 detects a K28.5 symbol included in Start Code, End Code, and Deskew Code to achieve the symbol synchronization. The symbol synchronizer 114 outputs packet data in 10-bit units representing each symbol to the 10B8B symbol decoder 115.

In addition, the symbol synchronizer 114 achieves the symbol synchronization by detecting a symbol boundary included in Sync Code that is repeatedly transmitted from the transmission unit 22 during the training mode before start of transmission of the packet data.

The 10B8B symbol decoder 115 performs the 10B8B conversion on the packet data in 10-bit units supplied from the symbol synchronizer 114, and outputs the packet data converted into data in 8-bit units to the skew corrector 116.

The skew corrector 116 detects Deskew Code from the packet data supplied from the 10B8B symbol decoder 115. Information on a detection timing of Deskew Code by the skew corrector 116 is supplied to the PHY-RX status controller 101.

In addition, the skew corrector 116 corrects Data Skew between the lanes, by matching the timing of Deskew Code with a timing indicated by information supplied from the PHY-RX status controller 101. The information supplied from the PHY-RX status controller 101 indicates the latest timing of the timings of Deskew Code detected in each of the signal processors 102-0 to 102-N.

The skew corrector 116 outputs the packet data whose Data Skew has been corrected to the control code remover 117.

The control code remover 117 removes the control codes added to the packet data, and outputs data from Start Code to End Code to the link layer as packet data.

The PHY-RX status controller 101 controls each unit of the signal processors 102-0 to 102-N, and causes each unit to perform correction of Data Skew between the lanes, etc. In addition, in a case where a transmission error occurs on a predetermined lane and a control code is lost, the PHY-RX status controller 101 performs error correction of the control code, by adding a control code transmitted via another lane in place of the lost control code.

[Configuration of Link Layer of Reception Unit 31]

As illustrated in FIG. 7, the reception unit 31 is provided with, as the configuration of the link layer, the LINK-RX protocol manager 121, a lane integrator 122, a packet separator 123, a payload error corrector 124, and a Byte to Pixel converter 125. The LINK-RX protocol manager 121 includes a status controller 131, a header error corrector 132, a data remover 133, and a footer error detector 134.

The lane integrator 122 integrates the packet data supplied from the signal processors 102-0 to 102-N of the physical layer, by rearranging the packet data in an order opposite to the order of distribution to each lane by the lane distributor 65 of the transmission unit 22.

When the packet data of each lane is integrated, lane stuffing data is removed by the lane integrator 122 under the control of the data remover 133. The lane integrator 122 outputs the integrated packet data to the packet separator 123.

The packet separator 123 separates the packet data corresponding to one packet integrated by the lane integrator 122 into packet data included in header data and packet data included in payload data. The packet separator 123 outputs the header data to the header error corrector 132, and outputs the payload data to the payload error corrector 124.

In addition, in a case where the packet includes a footer, the packet separator 123 separates the data corresponding to one packet into packet data included in header data, packet data included in payload data, and packet data included in footer data. The packet separator 123 outputs the header data to the header error corrector 132, and outputs the payload data to the payload error corrector 124. In addition, the packet separator 123 outputs the footer data to the footer error detector 134.

In a case where a parity is inserted in the payload data supplied from the packet separator 123, the payload error corrector 124 detects an error in the payload data by performing error correction calculation on the basis of the parity, and performs correction of the detected error.

The payload error corrector 124 outputs, to the Byte to Pixel converter 125, pixel data subjected to the error correction obtained by performing the error correction for each of Basic Blocks and Extra Blocks. In a case where the parity is not inserted in the payload data supplied from the packet separator 123, the payload data supplied from the packet separator 123 is outputted to the Byte to Pixel converter 125 as it is.

The Byte to Pixel converter 125 removes payload stuffing data included in the payload data supplied from the payload error corrector 124, under the control of the data remover 133.

In addition, the Byte to Pixel converter 125 performs the Byte to Pixel conversion of converting the data of each pixel in byte units obtained by removing the payload stuffing data into pixel data in units of, for example, 8 bits, 10 bits, 12 bits, 14 bits, or 16 bits. The conversion performed in the Byte to Pixel converter 125 is inverse to the Pixel to Byte conversion by the Pixel to Byte converter 62 of the transmission unit 22.

The Byte to Pixel converter 125 outputs the pixel data in units of, for example, 8 bits, 10 bits, 12 bits, 14 bits, or 16 bits obtained by the Byte to Pixel conversion to the frame data output section 141. In the frame data output section 141, for example, each line of effective pixels identified by Line Valid of header information is generated on the basis of the pixel data obtained by the Byte to Pixel converter 125, and an image of one frame is generated by each line being arranged in accordance with Line Number of the header information.

The status controller 131 of the LINK-RX protocol manager 121 manages a status of the link layer of the reception unit 31.

The header error corrector 132 acquires three sets of header information and a CRC code on the basis of the header data supplied from the packet separator 123. The header error corrector 132 performs, for each set of the header information and the CRC code, error detection calculation that is calculation for detection of an error in the header information, by using the CRC code of the same set as the header information.

In addition, the header error corrector 132 estimates correct header information on the basis of at least either of an error detection result of the header information of each set, and a comparison result of data determined by the error detection calculation, and outputs the header information estimated to be correct and a decoding result. The data determined by the error detection calculation is a value determined by applying the CRC generating polynomial to the header information. In addition, the decoding result is information indicating successful decoding or unsuccessful decoding.

Assume that the respective three sets of the header information and the CRC code are a set 1, a set 2, and a set 3. In this case, the header error corrector 132 acquires, by the error detection calculation for the set 1, whether or not the header information of the set 1 includes an error (the error detection result) and data 1 that is the data determined by the error detection calculation. In addition, the header error corrector 132 acquires, by the error detection calculation for the set 2, whether or not the header information of the set 2 includes an error and data 2 that is the data determined by the error detection calculation. The header error corrector 132 acquires, by the error detection calculation for the set 3, whether or not the header information of the set 3 includes an error and data 3 that is the data determined by the error detection calculation.

In addition, the header error corrector 132 determines each of whether or not the data 1 and the data 2 match, whether or not the data 2 and the data 3 match, and whether or not the data 3 and the data 1 match.

For example, in a case where no error is detected by all the error detection calculation for the set 1, the set 2, and the set 3, and all the comparison results of the data determined by the error detection calculation match, the header error corrector 132 selects information indicating successful decoding as the decoding result. In addition, the header error corrector 132 estimates that all the pieces of header information are correct, and selects any of the header information of the set 1, the header information of the set 2, and the header information of the set 3 as output information.

On the other hand, in a case where no error is detected by only the error detection calculation for the set 1, the header error corrector 132 selects information indicating successful decoding as the decoding result. In addition, the header error corrector 132 estimates that the header information of the set 1 is correct, and selects the header information of the set 1 as the output information.

In addition, in a case where no error is detected by only the error detection calculation for the set 2, the header error corrector 132 selects information indicating successful decoding as the decoding result. In addition, the header error corrector 132 estimates that the header information of the set 2 is correct, and selects the header information of the set 2 as the output information.

In a case where no error is detected by only the error detection calculation for the set 3, the header error corrector 132 selects information indicating successful decoding as the decoding result. In addition, the header error corrector 132 estimates that the header information of the set 3 is correct, and selects the header information of the set 3 as the output information.

The header error corrector 132 outputs the decoding result and the output information selected in the above manner to the register 142, and causes the register 142 to store the decoding result and the output information. In this manner, the header information error correction by the header error corrector 132 is performed by detecting header information without an error from among a plurality of pieces of header information by using the CRC code, and outputting the detected header information.

The data remover 133 controls the lane integrator 122 to remove the lane stuffing data, and controls the Byte to Pixel converter 125 to remove the payload stuffing data.

The footer error detector 134 acquires a CRC code stored in the footer, on the basis of the footer data supplied from the packet separator 123. The footer error detector 134 performs error detection calculation by using the acquired CRC code to detect an error in the payload data. The footer error detector 134 outputs an error detection result, and causes the register 142 to store the error detection result.

[Overview of Operation of Sensor Module 11 and DSP 12]

Next, an overview of operation of the sensor module 11 and the DSP 12 is described. Operation of the imaging device including the transmission system 1 is described as an example.

The imaging unit 21 of the sensor module 11 performs imaging in a case where an instruction for start of imaging is given by, for example, a shutter button provided in the imaging device being pressed. The frame data input section 52 of the imaging unit 21 (FIG. 6) outputs pixel data included in an image of one frame obtained by the imaging to the transmission unit 22, by outputting data of each one pixel in order.

By the data transmission processing by the transmission unit 22, a packet including a payload where pixel data corresponding to one line is stored is generated, and packet data included in the packet is transmitted to the reception unit 31.

The reception unit 31 performs the data reception processing. By the data reception processing, the packet data transmitted from the transmission unit 22 is received, and the pixel data stored in the payload is outputted to the image processing unit 32.

The data transmission processing performed by the transmission unit 22 and the data reception processing performed by the reception unit 31 are alternately performed for pixel data corresponding to one line. That is, if pixel data of a given one line is transmitted by the data transmission processing, the data reception processing is performed. If pixel data of one line is received by the data reception processing, the data transmission processing is performed for pixel data of the next one line. The data transmission processing by the transmission unit 22 and the data reception processing by the reception unit 31 may be performed temporally in parallel, as appropriate.

In a case where the transmission and reception of the pixel data of all the lines included in the image of one frame ends, the frame data output section 141 of the image processing unit 32 generates the image of one frame on the basis of the pixel data supplied from the reception unit 31.

[1.3 Improvement Example of Transmission System 1 According to One Embodiment]

As described with reference to FIG. 8 to FIG. 11, in the transmission system 1 according to one embodiment, it is possible to insert Pad Code into the payload data, to fill the transmission band difference between the transmission rate of the pixel data that is inputted from the imaging unit 21 to the transmission unit 22 (the pixel data band) and the transmission rate of the pixel data that is transmitted from the transmission unit 22 to be inputted to the reception unit 31 (the PHY transmission band). A Pad Code insertion ratio is determined by operation of the sensor module 11 serving as a transmission side, but the DSP 12 serving as a reception side does not have a means of finding the Pad Code insertion ratio, and has to be configured to be able to receive data including any kind of Pad Code inserted.

Hence, as an improvement example of the transmission system 1 according to one embodiment, described below is a technology of making it possible to find the Pad Code insertion ratio on the reception side.

It is to be noted that Pad Code is inserted into the payload in a case where the PHY transmission band is larger than the pixel data band and satisfies a predetermined condition. Pad Code is inserted, for example, in a case where the following conditional expression (A) is satisfied.

$$\text{CIS\_Bandwidth} \times (57/56) \times (5/4) < \text{PHY\_Bandwidth} \quad (A)$$

Here, in the conditional expression (A), CIS_Bandwidth corresponds to the pixel data band that is inputted from the imaging unit 21 to the transmission unit 22, and is represented by the following conditional expression (B).

$$\text{CIS\_Bandwidth} = \text{pixel\_clock\_rate} * \text{PIXEL\_BIT} \quad (B), \text{where}$$

pixel_clock_rate: a pixel input rate[Mpix/sec], and

PINXEL_BIT: the number of bits per pixel.

In addition, in the conditional expression (A), PHY_Bandwidth corresponds to the PHY transmission band of the pixel data that is transmitted from the transmission unit 22 to be inputted to the reception unit 31, and is represented by the following conditional expression (C).

PHY_Bandwidth=output_bit_rate*Lane_NUM    (C), where

Output_bit_rate: an output bit rate[bit/sec], and

Lane_NUM: the number of Lanes of output lanes.

In addition, in the conditional expression (A), (57/56) is data transmission efficiency when a 4 bits of parity bits are added, and is calculated in the following manner.

(224÷4)/224=57/56

In addition, in the conditional expression (A), (5/4) is the transmission efficiency of data subjected to the 8B10B conversion, and is calculated in the following manner.

10/8=5/4

FIG. 12 illustrates a first example of an improvement example of the transmission unit 22 in the transmission system 1 according to one embodiment.

In the first example illustrated in FIG. 12, the configuration illustrated in FIG. 6 additionally includes, in the LINK-TX protocol manager 61 of the transmission unit 22, an insertion ratio calculator 75 that calculates the Pad Code insertion ratio.

It is to be noted that the Pad Code insertion ratio indicates a ratio of a Pad Code length with respect to a payload length. Pad Code is inserted by the control code inserter 91 after data is distributed to the lanes, as described above.

FIG. 13 illustrates an example in which data indicating the Pad Code insertion ratio is added to a header.

The data indicating the Pad Code insertion ratio calculated by the insertion ratio calculator 75 may be added to a Reserved region in the header as illustrated in FIG. 13, for example. The header generator 72 generates, for example, the header in which the data indicating the Pad Code insertion ratio is added to the Reserved region.

In this case, the reception unit 31 is able to receive, via a lane, a packet including the data indicating the Pad Code insertion ratio in the header. Thus, on the reception side, the frame data output section 141 and the system controller 143, for example, are able to find the Pad Code insertion ratio.

FIG. 14 illustrates a second example of the improvement example of the transmission unit 22 in the transmission system 1 according to one embodiment.

The register 53 on the transmission side may be caused to store the data indicating the Pad Code insertion ratio calculated by the insertion ratio calculator 75 as illustrated in FIG. 14, for example. The register 53 is able to output, to the reception side, the data indicating the Pad Code insertion ratio via a path different from a lane that is a packet transmission path. The path different from the lane may be, for example, the control line 13 illustrated in FIG. 1 and FIG. 2. On the reception side, the data indicating the Pad Code insertion ratio may be received via the path different from the packet transmission path, and the register 142 on the reception side may be caused to store the data. Tus, on the reception side, the frame data output section 141 and the system controller 143, for example, are able to find the Pad Code insertion ratio. It is to be noted that a section other than the register 142 may store the data indicating the Pad Code insertion ratio. For example, the frame data output section 141 or the system controller 143 may store the data indicating the insertion ratio.

FIG. 15 illustrates a third example of the improvement example of the transmission unit 22 in the transmission system 1 according to one embodiment.

In addition, the data indicating the Pad Code insertion ratio calculated by the insertion ratio calculator 75 may be added to an Embedded Data region as illustrated in FIG. 15, for example. It is to be noted that, although FIG. 15 illustrates an example in which the preceding dummy region A3 includes the Embedded Data region, the Embedded Data region may be inserted in the subsequent dummy region A4. The packet generator 64 generates, for example, a packet in which the data indicating the Pad Code insertion ratio is added to the Embedded Data region.

In this case, the reception unit 31 is able to receive, via a lane, the packet including the data indicating the Pad Code insertion ratio in the dummy region. Thus, on the reception side, the frame data output section 141 and the system controller 143, for example, are able to find the Pad Code insertion ratio.

[1.3 Effects]

As described above, the improvement example of the transmission system 1 according to one embodiment makes it possible to find the Pad Code insertion ratio. This configuration makes it possible to perform optimum data processing. On the reception side, the frame data output section 141 and the system controller 143, for example, are able to find the Pad Code insertion ratio and the payload length.

It is to be noted that the effects described in the present specification are merely examples and not limitative, and other effects may be achieved. The same applies to effects of the following other embodiments.

2. Other Embodiments

The technology according to the present disclosure is not limited to the description of one embodiment described above, and various modifications may be made.

For example, the present technology may have the following configurations. According to the present technology having the following configurations, it is possible to find the Pad Code insertion ratio. This configuration makes it possible to perform optimum data processing.

(1)

A transmission device including:

a transmission unit configured to output, to a transmission channel, a plurality of packets each including a payload and a header added to the payload, the payload including pixel data corresponding to one line included in an image of one frame; and an insertion ratio calculator configured to calculate an insertion ratio of a padding code, the padding code being inserted into the payload to fill a difference between a transmission rate of the pixel data that is inputted to the transmission unit and a transmission rate of the pixel data that is outputted from the transmission unit to the transmission channel.

(2)

The transmission device according to (1), further including a header generator configured to add, to the header, data indicating the insertion ratio of the padding code calculated by the insertion ratio calculator.

(3)

The transmission device according to (1), further including a register configured to store data indicating the insertion ratio of the padding code calculated by the insertion ratio calculator.

(4)

The transmission device according to (3), in which the register is configured to output, to a reception device configured to receive the packet via the transmission channel, the data indicating the insertion ratio of the padding code via a path different from a transmission path of the packet.

(5)

The transmission device according to (1), further including a packet generator that is configured to generate the packet including a dummy region, in place of the pixel data, in the payload, and that adds data indicating the insertion ratio of the padding code to the dummy region.

(6)

The transmission device according to any one of (1) to (5), in which the padding code is inserted into the payload, in a case where the transmission rate of the pixel data that is outputted from the transmission unit to the transmission channel is larger than the transmission rate of the pixel data that is inputted to the transmission unit, and satisfies a predetermined condition.

(7)

A reception device including a reception unit configured to receive a plurality of packets each including a payload and a header added to the payload from a transmission unit of a transmission device via a transmission channel, the payload including pixel data corresponding to one line included in an image of one frame, in which the reception device is configured to receive data on an insertion ratio of a padding code from the transmission device, the padding code being inserted into the payload to fill a difference between a transmission rate of the pixel data that is inputted to the transmission unit and a transmission rate of the pixel data that is outputted from the transmission unit to the transmission channel.

(8)

The reception device according to (7), in which the reception unit is configured to receive, via the transmission channel, the packet including the data on the insertion ratio of the padding code.

(9)

The reception device according to (7), in which the reception device is configured to receive the data indicating the insertion ratio of the padding code via a path different from a transmission path of the packet.

(10)

A transmission system including:

a transmission device; and a reception device, in which the transmission device includes a transmission unit configured to output, to a transmission channel, a plurality of packets each including a payload and a header added to the payload, the payload including pixel data corresponding to one line included in an image of one frame, and an insertion ratio calculator configured to calculate an insertion ratio of a padding code, the padding code being inserted into the payload to fill a difference between a transmission rate of the pixel data that is inputted to the transmission unit and a transmission rate of the pixel data that is outputted from the transmission unit to the transmission channel.

(11)

The transmission system according to (10), in which the reception device includes a reception unit configured to receive the plurality of packets from the transmission unit of the transmission device via the transmission channel, and is configured to receive data on the insertion ratio of the padding code from the transmission device.

This application claims the benefit of Japanese Priority Patent Application No. 2019-209580 filed with the Japan Patent Office on Nov. 20, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmission device comprising:

a memory storing program code, and at least one processor configured to execute the program code to perform operations comprising outputting, to a transmission channel, a plurality of packets each including a payload and a header added to the payload, the payload including pixel data corresponding to one line included in an image of one frame; and calculating an insertion ratio of a padding code, the padding code being inserted into the payload to fill a difference between a transmission rate of the pixel data as input for transmission and a transmission rate of the pixel data to be output to the transmission channel.

2. The transmission device according to claim 1, wherein the operations further comprise:

adding, to the header, data indicating the insertion ratio of the padding code.

3. The transmission device according to claim 1, further comprising:

a register configured to store data indicating the insertion ratio of the padding code.

4. The transmission device according to claim 3, wherein the register is configured to output, to a reception device configured to receive the packet via the transmission channel, the data indicating the insertion ratio of the padding code via a path different from a transmission path of the packet.

5. The transmission device according to claim 1, wherein the operations further comprise:

generating the packet to include a dummy region, in place of the pixel data, in the payload, and adding data indicating the insertion ratio of the padding code to the dummy region.

6. The transmission device according to claim 1, wherein the padding code is inserted into the payload, in a case where the transmission rate of the pixel data that is output to the transmission channel is larger than the transmission rate of the pixel data as input for transmission, and satisfies a predetermined condition.

7. A reception device comprising a reception unit configured to receive a plurality of packets each including a payload and a header added to the payload from a transmission unit of a transmission device via a transmission channel, the payload including pixel data corresponding to one line included in an image of one frame, wherein the reception device is configured to receive data on an insertion ratio of a padding code from the transmission device, the padding code being inserted into the payload to fill a difference between a transmission rate of the pixel data that is inputted to the transmission unit and a transmission rate of the pixel data that is outputted from the transmission unit to the transmission channel.

8. The reception device according to claim 7, wherein the reception unit is configured to receive, via the transmission channel, the packet including the data on the insertion ratio of the padding code.

9. The reception device according to claim 7, wherein the reception device is configured to receive the data indicating the insertion ratio of the padding code via a path different from a transmission path of the packet.

10. A transmission system comprising:

a transmission device according to claim 1, and a reception device.

11. The transmission system according to claim 10, wherein the reception device includes a reception unit configured to receive the plurality of packets from the transmission unit of the transmission device via the transmission channel, and to receive data on the insertion ratio of the padding code from the transmission device.

* * * * *